(12) United States Patent  (10) Patent No.: US 8,572,985 B2
Waddleton  (45) Date of Patent: Nov. 5, 2013

(54) AIR FILTRATION SYSTEM FOR GAS TURBINE ENGINE PNEUMATIC SYSTEM

(75) Inventor: David Waddleton, Candiac (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1167 days.

(21) Appl. No.: 12/492,214

(22) Filed: Jun. 26, 2009

(65) Prior Publication Data

US 2010/0326090 A1    Dec. 30, 2010

(51) Int. Cl.
*F02C 9/00* (2006.01)
*F02C 6/04* (2006.01)

(52) U.S. Cl.
USPC .............................. 60/795; 60/785

(58) Field of Classification Search
USPC .......................... 60/785, 795, 782
See application file for complete search history.

(56) References Cited

U.S. PATENT DOCUMENTS

| | | | |
|---|---|---|---|
| 4,158,449 A | 6/1979 | Sun et al. | |
| 4,245,462 A | 1/1981 | McCombs, Jr. | |
| 4,649,950 A | 3/1987 | Bradley et al. | |
| 5,116,362 A | 5/1992 | Arline et al. | |
| 5,315,818 A | 5/1994 | Smith | |
| 5,339,636 A | 8/1994 | Donnelly et al. | |
| 5,477,673 A * | 12/1995 | Blais et al. | ............ 60/785 |
| 5,517,821 A | 5/1996 | Braesch et al. | |
| 5,715,674 A | 2/1998 | Reuter et al. | |
| 5,795,998 A | 8/1998 | Smith | |
| 5,918,458 A | 7/1999 | Coffinberry et al. | |
| 6,102,001 A | 8/2000 | McLevige | |
| 6,217,280 B1 | 4/2001 | Little | |
| 6,393,826 B1 | 5/2002 | Yamanaka et al. | |
| 6,769,259 B2 | 8/2004 | Yamanaka et al. | |
| 6,792,762 B1 | 9/2004 | Yamanaka et al. | |
| 6,813,876 B2 | 11/2004 | Griffiths et al. | |
| 6,901,761 B1 | 6/2005 | Berkeley et al. | |
| 6,907,738 B1 | 6/2005 | Berkeley et al. | |
| 6,990,815 B2 | 1/2006 | Yamanaka et al. | |
| 7,104,282 B2 | 9/2006 | Hooker et al. | |
| 7,204,076 B2 | 4/2007 | Griffiths et al. | |
| 7,237,386 B2 | 7/2007 | Hoffmann et al. | |
| 7,252,068 B2 | 8/2007 | Eick et al. | |
| 7,837,753 B2 * | 11/2010 | Roundy et al. | ............ 55/385.3 |
| 2007/0119146 A1 | 5/2007 | Callas et al. | |

* cited by examiner

*Primary Examiner* — Gerald L Sung
(74) *Attorney, Agent, or Firm* — Norton Rose Fulbright Canada LLP

(57) ABSTRACT

A gas turbine engine pneumatic system for controlling an air bleed valve includes a variable orifice device for controllably discharging air from the pneumatic system in order to reduce a maximum air pressure applied to the air bleed valve, to a predetermined level. A filter device is provided to filter the air discharged from the variable orifice.

6 Claims, 4 Drawing Sheets

AIR FILTRATION SYSTEM FOR GAS TURBINE ENGINE PNEUMATIC SYSTEM

TECHNICAL FIELD

The described subject matter relates generally to gas turbine engines and more particularly, to an improved gas turbine engine pneumatic system including an air filtration system.

BACKGROUND OF THE ART

In aerospace gas turbine engines, it is a common practice to have a gas turbine engine pneumatic system using high pressure air to control the open/closed condition of air bleed valves which are conventionally used, for example, in maintaining the operability of gas turbine engines. An example of a gas turbine engine pneumatic system for controlling the open/closed condition of an air bleed valve is schematically shown in FIG. 4 in which a pressure Px is applied to one side of a poppet valve against the high pressure $P_o$ of compressed air acting on the other side of the poppet valve. The Px pressure is generated for example, by a simple dropping orifice network flowing air between a high pressure air source and a low pressure sink which is usually the ambient air pressure. The arrangement, in conjunction with the reference spring (not numbered), provides for a predetermined relationship between the valve open/closed positions and the pressure Px which in turn is based on the geometric features. For some gas turbine engine installations, it is necessary to adjust this relationship to provide additional engine operational flexibility, particularly during transient maneuvers. Accordingly, there is a need to provide an improved gas turbine engine pneumatic system for controlling an air bleed valve.

SUMMARY

In one aspect, there is provided a gas turbine engine pneumatic system for controlling an air bleed valve, comprising: an apparatus for generating a maximum air pressure; a first passage extending between the apparatus and the air bleed valve for applying the maximum air pressure to the air bleed valve to close the air bleed valve against a pressure of pressurized air; a second passage connected to the first passage and a variable orifice device included in the second passage to controllably discharge air from the first passage through the variable orifice device, thereby reducing the maximum air pressure applied to the air bleed valve to a predetermined level; and a filter device located in the pneumatic system for filtering the air discharged through the variable orifice device.

In another aspect, there is provided a gas turbine engine comprising: an air bleed valve for selectively bleeding air from a contained pressurized air; a pneumatic system for applying a maximum air pressure to the air bleed valve to close the air bleed valve against a pressure of the pressurized air; wherein the pneumatic system comprises a variable orifice device for controllably discharging air from the pneumatic system through the variable orifice device, thereby reducing the maximum air pressure applied to the air bleed valve to a predetermined level; and wherein the pneumatic system comprises means for filtering the air discharged through the variable orifice device.

Further details of these and other aspects of the described subject will be apparent from the detailed description and drawings included below.

DESCRIPTION OF THE DRAWINGS

Reference is now made to the accompanying drawings depicting aspects of the described subject, in which.

DETAILED DESCRIPTION

Figure 1:
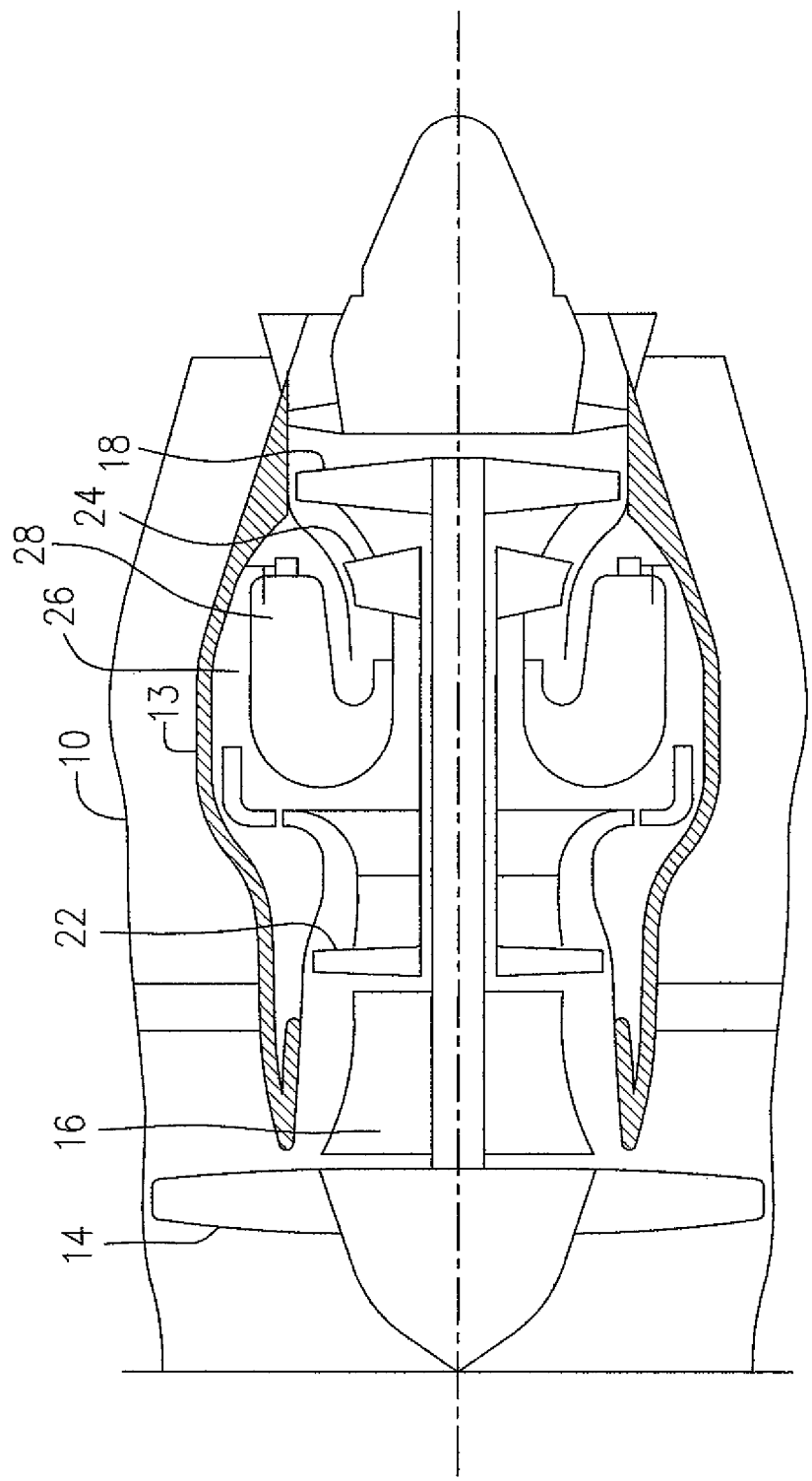
FIG. 1 is a schematic cross-sectional view of a turbofan gas turbine engine as an exemplary application of the described subject matter.

Referring to FIG. 1, a turbofan gas turbine engine presented as an example of the application of the described subject matter, includes a housing or nacelle 10, a core casing 13, a low pressure spool assembly which includes a fan assembly 14, a low pressure compressor assembly 16 and a low pressure turbine assembly 18, and a high pressure spool assembly which includes a high pressure compressor assembly 22 and a high pressure turbine assembly 24. In a main fluid path there is provided a combustor 28 to constitute a gas generator section 26.

Figure 2:
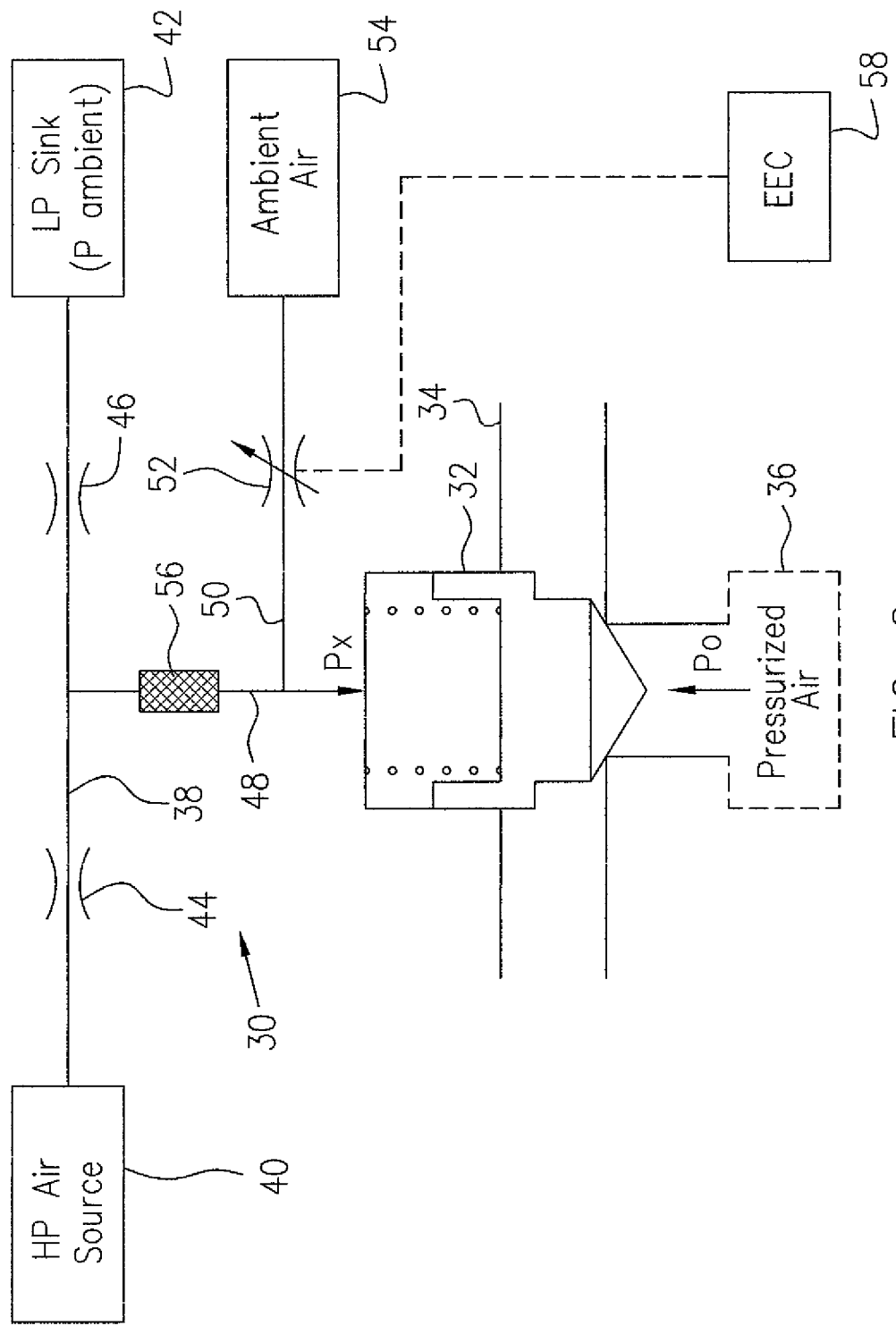
FIG. 2 is a schematic illustration of a gas turbine engine pneumatic system for controlling an air bleed valve according to one embodiment.

Referring to FIG. 2, a gas turbine engine pneumatic system generally indicated by numeral 30 according to this embodiment is provided for controlling an air bleed valve 32 such as a poppet valve which is a valve having a hole (not shown), usually round or oval and a tapered plug (not shown), usually a disk shape on the end of a shaft (also called a valve stem) (not shown). The shaft guides the plug portion by sliding through a valve guide (not shown). In most applications, a pressure differential helps to seal the valve and in some applications also opens the valve. In this embodiment, the air bleed valve 32 is used under a maximum air pressure Px to seal an air bleed passage 34 to prevent air bleeding from a pressurized air system 36 to the air bleed passage 34. Po indicates the air pressure of the pressurized air system 36, acting on the air bleed valve 32.

The open/closed positions of the air bleed valve 32 are determined by forces acting on the opposite ends of the air bleed valve 32 which relate to the respective air pressures Po, Px (acting on the opposite ends of the valve) and the affected areas on which the respective air pressures Po, Px, act. Additional spring forces if any spring device is provided within the air bleed valve 32, may also act on the valve. Therefore, changes in Po/Px pressure relationship may cause position changes of the air bleed valve 32 between the open and closed positions. Therefore, controlling the air bleed valve 32 may be achieved by adjusting the maximum air pressure Px with respect to the air pressure Po of the pressurized air.

The pneumatic system 30 may be presented, for example, as a simple orifice network in which a main air passage 38 is in fluid communication with a high pressure air source 40 at an upstream end of the pneumatic system 30, and with a low pressure sink 42 which may actually be presented by ambient air pressure at a downstream end of the pneumatic system. Orifices 44, 46 represent fluid flow resistances existing in respective upstream and downstream sections of the main air passage 38, but do not necessarily represent the physical confirmation or components of the orifice network. Therefore, a dropping orifice network air flow (not shown) passing through the main air passage 38 between the orifices 44 and 46, will generate the maximum air pressure Px. An air passage 48 extending from the main air passage 38 at a location between the orifices 44, 46 to the air bleed valve 32, is used to apply the maximum air pressure Px to the air bleed valve 32 in order to close the air bleed valve against the pressure Po of the pressurized air. The fluid flow resistances represented by the orifices 44, 46 are determined by the nature of the physical configuration of the main air passage 38. The maximum air pressure Px is determined by the fluid flow resistance represented by the orifices 44 and 46, and is not adjustable once the physical configuration of the main air passage 38 is determined.

A further air passage 50 which includes a variable orifice device 52, is connected to the air passage 48 for controllably discharging air from the air passage 48 through the variable orifice device 52 into a location 54, for example with ambient air. This reduces the maximum air pressure Px applied to the air bleed valve 32 to a predetermined level, thereby adjusting the maximum air pressure Px and thus controlling the open/closed threshold of the bleed valve 32.

A filter device such as a full-flow filter 56 may be installed in the air passage 48 at a location upstream of a point where the air passage 50 is connected to the air passage 48. Therefore, the entire air flow which passes through the air passage 48 and the full-flow filter 56 and then through the air passage 50 and the variable orifice device 52, is fully filtered by the full-flow filter 56 to prevent small gaps and fine holes in the variable orifice device 52 from being blocked or damaged by debris or particles carried by the air flow passing through the variable orfice device 52. The full-flow filter 56 may require periodic cleaning or replacement at intervals depending upon the operating environment of the engine.

The variable orifice device 52 may be controlled by the engine control system such as the engine electric controller (EEC) 58.

Figure 3:
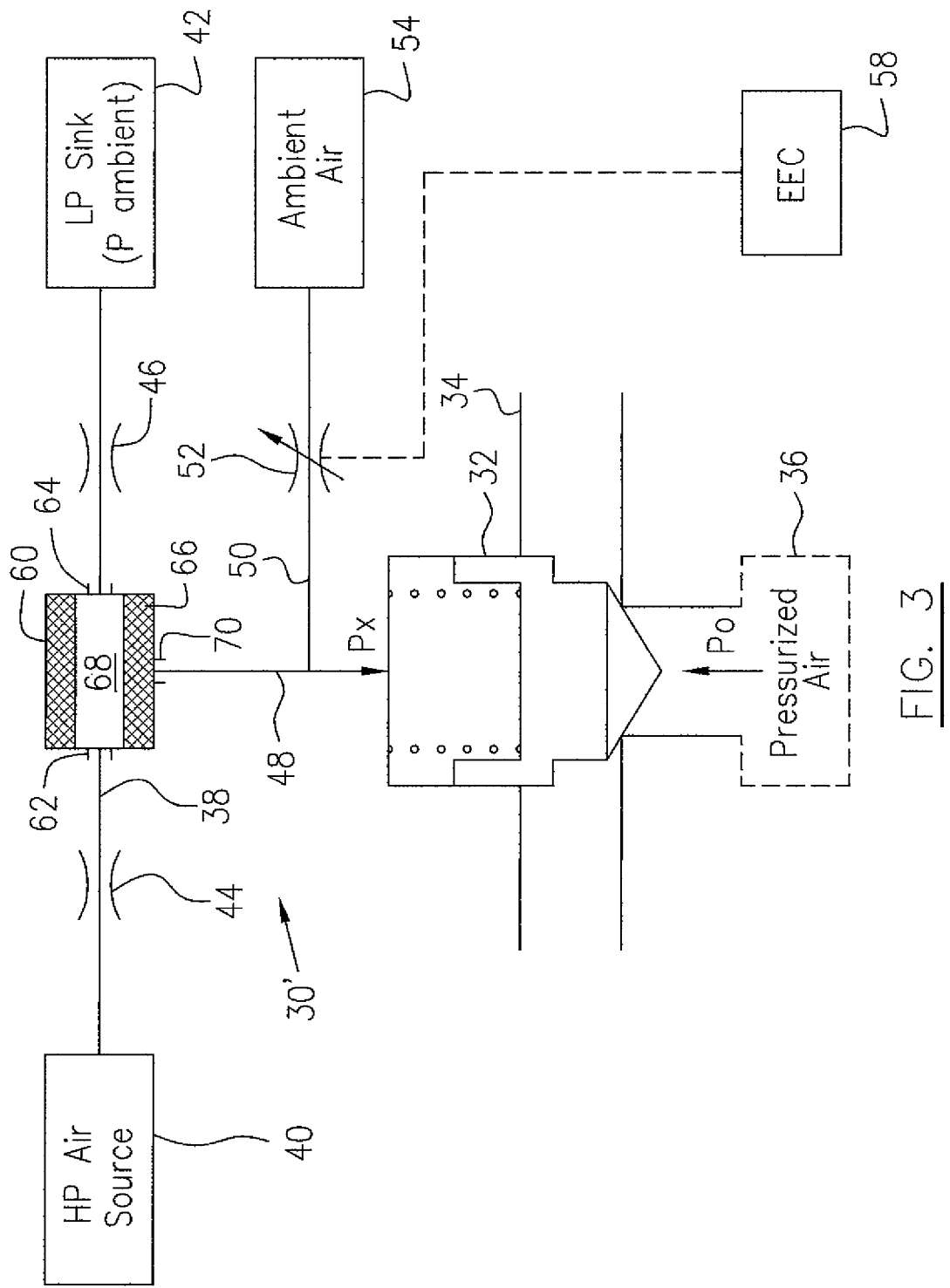
FIG. 3 is a schematic illustration of a gas turbine engine pneumatic system for controlling an air bleed valve according to another embodiment.
Figure 4:
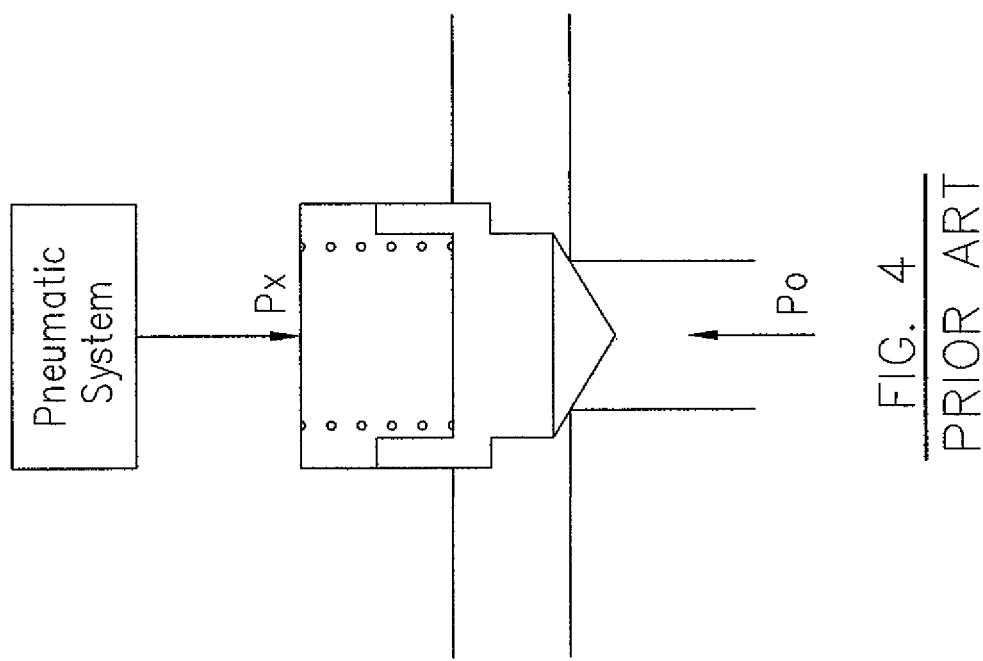
FIG. 4 is a schematic illustration of a prior art gas turbine engine pneumatic system for controlling an air bleed valve.

Referring to FIG. 3, a gas turbine engine pneumatic system 30' is provided for controlling the open/closed condition of the air bleed valve 32 according to another embodiment alternative to the gas turbine engine pneumatic system 30 of FIG. 2. Components and features of the alternative embodiment shown in FIG. 3 which are similar to those of FIG. 2 and are indicated by similar numerals will not be redundantly described. In contrast to the use of a full-flow filter 56, a wash filter 60 may be installed in the main air passage 38 at a location between the orifices 44, 46 and connected to air passage 48. For example, the wash filter 60 may be configured with a cylinder (not numbered) having an inlet 62 and an outlet 64 defined at opposed ends of the cylinder. A layer of filtering medium 66 may be provided within the cylinder and attached to the entire cylindrical inner surface of the cylinder in order to define an axial passage 68 extending between the inlet 62 and outlet 64, thereby allowing a first portion of an air flow which enters the inlet 62 of the wash filter 60, to pass through the axial passage 68 and to be discharged out of the wash filter 60 through the outlet 64 without filtration. A side outlet 70 connected to the air passage 48 may be defined in the sidewall of the cylinder in order to allow a second portion of the air flow which enters the inlet 62 of the wash filter 60, to pass through the filtering medium 66 and to then be discharged out of the wash filter 60 through the side outlet 70 into the air passage 48, thereby generating the maximum air pressure Px.

The air flow which passes through air passage 48 and air passage 50 and the variable orfice device 52 is fully filtered by the wash filter 60. The wash filter 60, in contrast to the full-flow filter 56 in FIG. 2, may require less cleaning and filter replacement, thereby significantly extending filter maintenance intervals because the air flow required for the dropping orifice network (through the main air passage 38) passes through the axial passage 68 of the wash filter 60 and thus washes the filtering medium 66, thereby carrying debris and particles trapped in the filtering medium 66 away from the wash filter 60.

It should be noted that the full-flow filter 56 of FIG. 2 is known in the art and the specific configuration thereof is not described in detail. Full-flow filters of various types may be applicable for the gas turbine engine pneumatic system as described with reference to FIG. 2. It should also be noted that wash filters are known in the art and wash filters of various types different from the described wash filter 60 of FIG. 3, may be used for the pneumatic system described with reference to FIG. 3.

The above description is meant to be exemplary only, and one skilled in the art, will recognize that changes may be made to the embodiments described without departure from the scope of the described subject matter. For example, although a simple dropping orifice network is illustrated as an example of the gas turbine engine pneumatic system in the above described embodiments, other differently configured pneumatic systems may be applicable for incorporating the principal of the described subject matter. The variable orifice device used in the above described embodiments may be configured with currently known or unknown structures. Still, other modifications which fall within the scope of the described subject matter will be apparent to those skilled in the art, in light of a review of this disclosure, and such modifications are intended to fall within the appended claims.

The invention claimed is:

1. A gas turbine engine pneumatic system for controlling an air bleed valve, comprising:
    an apparatus for generating a maximum air pressure;
    a first passage extending between the apparatus and the air bleed valve for applying the maximum air pressure to the air bleed valve to close the air bleed valve against a pressurized air;
    a second passage connected to the first passage and a variable orifice device included in the second passage to controllably discharge air from the first passage through the variable orifice device, thereby reducing the maximum air pressure applied to the air bleed valve to a predetermined level; and
    a wash filter located in the pneumatic system for filtering the air discharged through the variable orifice device, wherein the wash filter comprises an inlet and first and second outlets, the inlet and first outlet being connected to a main passage of the apparatus to allow an air flow to be introduced into the inlet, a first portion of the air flow passing through the wash filter without filtration and being discharged through the first outlet, and the second outlet being connected to the first passage to allow a second portion of the air flow introduced into the inlet to be filtered and to enter the first passage.

2. The gas turbine engine pneumatic system as defined in claim 1 wherein the wash filter comprises a cylinder defining a central passage between the inlet and the first outlet, surrounded by a filtering medium, the second outlet being in fluid communication with the central passage through the surrounding filtering medium.

3. The gas turbine engine pneumatic system as defined in claim 1 wherein the apparatus comprises an orifice network having an upstream end in fluid communication with a high pressure air source and a downstream end in fluid communication with a low pressure sink.

4. The gas turbine engine pneumatic system as defined in claim 2 wherein the low pressure sink is an ambient air pressure.

5. A gas turbine engine comprising:
an air bleed valve for selectively bleeding air from a contained pressurized air; and
a pneumatic system for applying a maximum air pressure to the air bleed valve to close the air bleed valve against a pressure of the pressurized air;
wherein the pneumatic system comprises a variable orifice device for controllably discharging air from the pneumatic system through the variable orifice device, thereby reducing the maximum air pressure applied to the air bleed valve to a predetermined level; and
wherein the pneumatic system comprises a wash filter for filtering the air discharged through the variable orifice device, the wash filter filtering a first portion of an entire air flow entering the wash filter and directing a second portion of the entire air flow to pass through the wash filter without filtration, thereby forming a washing air flow for cleaning the wash filter.

6. The gas turbine engine as defined in claim 5 wherein the wash filter is included in a main passage of the pneumatic system to thereby allow a dropping orifice network air flow to pass the wash filter as the washing air flow, and wherein a first passage extends between the wash filter and the air bleed valve, and a second passage including the variable orifice device is connected to the first passage, thereby directing the filtered first portion of the air flow to pass through the first and second passages.

* * * * *